United States Patent
Aota

(10) Patent No.: US 11,022,737 B2
(45) Date of Patent: Jun. 1, 2021

(54) WIRE GRID POLARIZATION ELEMENT HAVING GRADUALLY CHANGING PROPORTIONS OF ELEMENTS, LIQUID CRYSTAL APPARATUS, AND ELECTRONIC DEVICE

(71) Applicant: SEIKO EPSON CORPORATION, Tokyo (JP)

(72) Inventor: Masaaki Aota, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 196 days.

(21) Appl. No.: 16/419,069

(22) Filed: May 22, 2019

(65) Prior Publication Data

US 2019/0361162 A1    Nov. 28, 2019

(30) Foreign Application Priority Data

May 23, 2018    (JP) .............................. JP2018-098509

(51) Int. Cl.
*G02B 5/30*       (2006.01)
*G02B 27/28*      (2006.01)
*G02F 1/1335*     (2006.01)
*G03B 21/00*      (2006.01)
*G03B 33/12*      (2006.01)

(52) U.S. Cl.
CPC ...... *G02B 5/3058* (2013.01); *G02F 1/133528* (2013.01); *G03B 21/006* (2013.01); *G03B 33/12* (2013.01)

(58) Field of Classification Search
CPC ............... G02B 5/3058; G02B 27/149; G02F 1/133528; G02F 1/133548; G03B 21/006; G03B 21/2073; G03B 33/12
See application file for complete search history.

(56) References Cited

U.S. PATENT DOCUMENTS

| | | | |
|---|---|---|---|
| 7,961,393 | B2 | 6/2011 | Perkins et al. |
| 2008/0002554 | A1 | 1/2008 | Nagata et al. |
| 2008/0225389 | A1 | 9/2008 | Oh et al. |
| 2017/0045658 | A1 | 2/2017 | Kumai |

FOREIGN PATENT DOCUMENTS

| | | |
|---|---|---|
| CN | 101334497 A | 12/2008 |
| JP | 2008-009069 A | 1/2008 |
| JP | 2008-216964 A | 9/2008 |
| JP | 2012-103469 A | 5/2012 |
| JP | 2017-037158 A | 2/2017 |

*Primary Examiner* — Ryan S Dunning
(74) *Attorney, Agent, or Firm* — Oliff PLC

(57) ABSTRACT

In a wire grid polarization element where wires are arranged in parallel on one surface of the substrate, each of the wires includes in a thickness direction thereof a reflection section composed primarily of a light reflective material and an absorption section composed primarily of a light absorptive material. The reflection section includes oxygen. Between a first portion on the substrate side of the reflection section and a second portion at an edge on an opposite side the reflection section from the substrate, is provided a mixture portion (a first mixture portion) where a proportion of oxygen gradually decreases and a proportion of aluminum which is the light reflective material gradually increases from the second portion to the first portion. Thus, even when the reflection section is provided with portions having different compositions, development of an interface does not occur inside the reflection section.

6 Claims, 11 Drawing Sheets

WIRE GRID POLARIZATION ELEMENT HAVING GRADUALLY CHANGING PROPORTIONS OF ELEMENTS, LIQUID CRYSTAL APPARATUS, AND ELECTRONIC DEVICE

The present application is based on and claims priority from JP Application Serial Number 2018-098509, filed May 23, 2018, the disclosure of which is hereby incorporated by reference herein in its entirety.

BACKGROUND

1. Technical Field

The disclosure relates to a wire grid polarization element including a wire grid including a plurality of wires arranged in parallel and extending, a manufacturing method of a wire grid polarization element, and an electronic device.

2. Related Art

In a wire grid polarization element, a plurality of wires is arranged in parallel on one surface of a transmissive substrate, primary linearly polarized light (P polarized light) vibrating in a direction perpendicular to an extending direction of the wires is transmitted, and transmission of secondary linearly polarized light (S polarized light) vibrating in the extending direction of the wires is inhibited. In the wire grid polarization element, in the wire, a dielectric film including an oxide or the like of aluminum, silicon or the like, an absorption layer including a light absorptive element such as silicon, and an oxide film including an oxide of the absorption layer are laminated on a reflection layer including a light reflective element such as aluminum in a thickness direction that is a normal line direction to one surface of the substrate (see JP-A-2017-37158).

In the wire grid polarization element, the dielectric layer and the oxide film are a configuration related to improvement of reliability, reduction in reflectance or the like, and are a configuration that is effective to keep performance for a long period in a wire grid polarization element used for a projector used in a severe situation under high brightness and high temperature. However, in the above described configuration, there is an interface in each of a portion between the reflection layer and the dielectric film, a portion between the dielectric film and the absorption layer, and a portion between the absorption layer and the oxide film, and there are problems of reflection or the like on each interface.

SUMMARY

In view of the problems mentioned above, the disclosure provides a wire grid polarization element, a liquid crystal apparatus, and an electronic device which can suppress developments of interfaces in the configuration including a dielectric layer, an oxide film or the like.

To solve the above described problem, one aspect of the disclosure includes a substrate, and a wire including a reflection section including a light reflective material, and an absorption section including a light absorptive material on an opposite side of the reflection section from the substrate, wherein the reflection section includes at least one element of oxygen, nitrogen, and carbon, and a first mixture portion is provided between a first portion on the substrate side of the reflection section and a second portion at an edge on an opposite side of the reflection section from the substrate, and in the first mixture portion a proportion of the at least one element of oxygen, nitrogen, and carbon gradually decreases and a proportion of an element of the light reflective material gradually increases from the second portion to the first portion.

In the disclosure, in the wires constituting a wire grid, the reflection section includes at least one element of oxygen, nitrogen, and carbon, and the first mixture portion where the composition changes gently is provided between the first portion on the substrate side of the reflection section and the second portion at the end on an opposite side of the reflection section from the substrate. Thus, even if the reflection section is provided with portions having different compositions, there is no interface in the reflection section. Therefore, problems such as reflection caused by the presence of an interface and reduction of adhesion in an interface under a high temperature environment hardly occur.

Another aspect of the disclosure includes a substrate, and a wire including a reflection section including a light reflective material, and an absorption section including a light absorptive material on an opposite side of the reflection section from the substrate, wherein the absorption section includes at least one element of oxygen, nitrogen, and carbon, and a second mixture portion is provided between a third portion at an edge on the substrate side of the absorption section and a fourth portion on an opposite side of the absorption section from the substrate, and in the second mixture portion a proportion of the at least one element of oxygen, nitrogen, and carbon gradually decreases and a proportion of an element of the light absorptive material gradually increases from the third portion to the fourth portion.

In the disclosure, in the wires constituting a wire grid, the absorption section includes at least one element of oxygen, nitrogen, and carbon, and the second mixture portion where the composition changes gently is provided between the third portion at the end on an opposite side of the absorption section from the substrate and the fourth portion on the substrate side of the absorption section. Thus, even if the absorption section is provided with portions having different compositions, there is no interface in the absorption section. Therefore, problems such as reflection caused by the presence of an interface and reduction of adhesion in an interface under a high temperature environment hardly occur.

Still another aspect of the disclosure includes a substrate, and a wire including a reflection section including a light reflective material, and an absorption section including a light absorptive material on an opposite side of the reflection section from the substrate, wherein the reflection section includes at least one element of oxygen, nitrogen, and carbon and an element included in the substrate, and a third mixture portion is provided between a fifth portion at an edge on the substrate side of the reflection section and a sixth portion on an opposite side of the reflection section from the substrate, and in the third mixture portion a proportion of the at least one element of oxygen, nitrogen, and carbon and a proportion of an element included in the substrate gradually decrease and a proportion of an element of the light reflective material gradually increases from the fifth portion to the sixth portion.

In the disclosure, in the wires constituting a wire grid, the reflection section includes at least one element of oxygen, nitrogen, and carbon, and the third mixture portion where the composition changes gently is provided between the fifth portion at the end on the substrate side of the reflection section and the sixth portion on an opposite side of the reflection section from the substrate. Thus, even if the reflection section is provided with portions having different compositions, there is no interface in the reflection section. Therefore, problems such as reflection caused by the presence of an interface and reduction of adhesion in an interface under a high temperature environment hardly occur.

Still another aspect of the disclosure includes a substrate, and a wire including a reflection section including a light reflective material, and an absorption section including a light absorptive material on an opposite side of the reflection section from the substrate, wherein the absorption section includes at least one element of oxygen, nitrogen, and carbon, and a fourth mixture portion is provided between a seventh portion at an edge on an opposite side of the absorption section from the substrate and an eighth portion on the substrate side of the absorption section, and in the fourth mixture portion a proportion of the at least one element of oxygen, nitrogen, and carbon gradually decreases and a proportion of an element of the light absorptive material gradually increases from the seventh portion to the eighth portion.

In the disclosure, in the wires constituting a wire grid, the absorption section includes at least one element of oxygen, nitrogen, and carbon, and the forth mixture portion where the composition changes gently is provided between the seventh portion at the end on an opposite side of the absorption section from the substrate and the eighth portion on the substrate side of the absorption section. Thus, even if the absorption section is provided with portions having different compositions, there is no interface in the absorption section. Therefore, problems such as reflection caused by the presence of an interface and reduction of adhesion in an interface under a high temperature environment hardly occur.

Still another aspect of the disclosure includes a substrate, and a wire including a reflection section including a light reflective material, and an absorption section including a light absorptive material on an opposite side of the reflection section from the substrate, wherein the reflection section includes at least one element of oxygen, nitrogen, and carbon, a first mixture portion is provided between a first portion on the substrate side of the reflection section and a second portion at an edge on an opposite side of the reflection section from the substrate, and in the first mixture portion a proportion of the at least one element of oxygen, nitrogen, and carbon gradually decreases and a proportion of an element of the light reflective material gradually increases from the second portion to the first portion, and the absorption section includes at least one element of oxygen, nitrogen, and carbon, and a second mixture portion is provided between a third portion at an edge on the substrate side of the absorption section and a fourth portion at the end on an opposite side of the absorption section from the substrate, and in the second mixture portion a proportion of the at least one element of oxygen, nitrogen, and carbon gradually decreases and a proportion of an element of the light absorptive material gradually increases from the third portion to the fourth portion.

In the disclosure, in the wires constituting a wire grid, the reflection section includes at least one element of oxygen, nitrogen, and carbon, and the first mixture portion where the composition changes gently is provided between the first portion on the substrate side of the reflection section and the second portion at the end on an opposite side of the reflection section from the substrate. Thus, even if the reflection section is provided with portions having different compositions, there is no interface in the reflection section. The absorption section includes at least one element of oxygen, nitrogen, and carbon, and the second mixture portion where the composition changes gently is provided between the third portion at the end on an opposite side of the absorption section from the substrate and the fourth portion on the substrate side of the absorption section. Thus, even if the absorption section is provided with portions having different compositions, there is no interface in the absorption section. Therefore, problems such as reflection caused by the presence of an interface and reduction of adhesion in an interface under a high temperature environment hardly occur.

The liquid crystal apparatus including the wire grid polarization element to which the disclosure is applied can adopt an aspect where the wire grid polarization element is disposed on at least one of an incident path of light to a liquid crystal panel and an emitting path of light from the liquid crystal panel. The liquid crystal apparatus thus configured can be used for various electronic devices or the like such as a direct viewing type display apparatus or a projection-type display apparatus.

DESCRIPTION OF EXEMPLARY EMBODIMENTS

Figure 1:
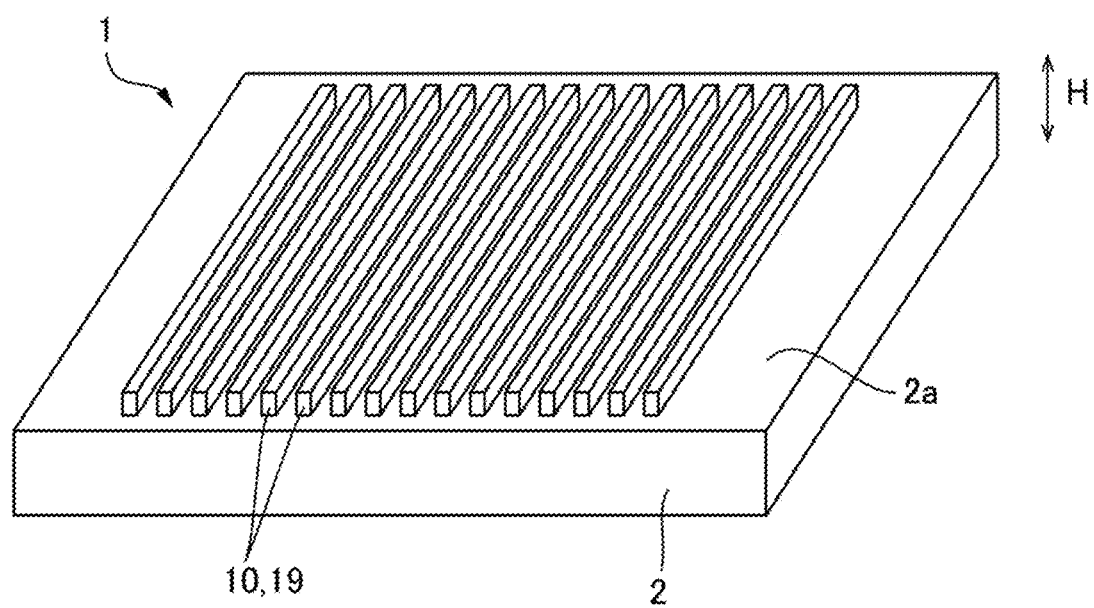
FIG. 1 is an explanatory diagram of a wire grid polarization element to which the disclosure is applied.

Exemplary embodiments of the disclosure will be described below with reference to the drawings. Note that, in each of the figures to be referred to in the following description, to illustrate each layer, each member, and the like in a recognizable size in the drawings, each layer, each member, and the like are illustrated at a different scale. In the following description, a thickness direction H is a normal line direction that is perpendicular to one surface 2a of a substrate 2. In the following description, one side of the thickness direction H may be either the side where the substrate 2 is located or the opposite side of the side where the substrate 2 is located.

Exemplary Embodiment 1

Entire Configuration of Wire Grid Polarization Element 1

FIG. 1 is an explanatory diagram of a wire grid polarization element 1 to which the disclosure is applied. As illustrated in FIG. 1, the wire grid polarization element 1 includes a transmissive substrate 2, and a wire grid 19 formed on one surface 2a of the substrate 2. The wire grid 19 includes a plurality of wires 10 arranged in parallel at an equal pitch.

As the substrate 2, a transmissive substrate such as a glass substrate, a quartz substrate, a crystal substrate, and a plastic substrate is used. Depending on applications of the wire grid polarization element 1, the wire grid polarization element 1 may accumulate heat and have a high temperature, and thus, highly thermal resistant glass or quartz is used as the substrate 2 in this exemplary embodiment. A width of each wire 10 and a space between the wires 10 (an interval between the wires 10) are each 300 nm or less, such as 150 nm or less. In this exemplary embodiment, the width of the wire 10 and the space between the wires 10 each range from 20 nm to 50 nm, and a thickness of the wire 10 ranges from 150 nm to 300 nm, for example.

In the wire grid 19 constituted as described above, in a case that a pitch of the wires 10 is smaller enough than a wavelength of incident light, among the incident light, primary linearly polarized light (P wave, TM wave) vibrating in a direction perpendicular to an extending direction of the wires 10 is transmitted, and transmission of secondary linearly polarized light (S wave, TE wave) vibrating in the extending direction of the wires 10 is inhibited.

Configuration of Wires 10

Figure 2:
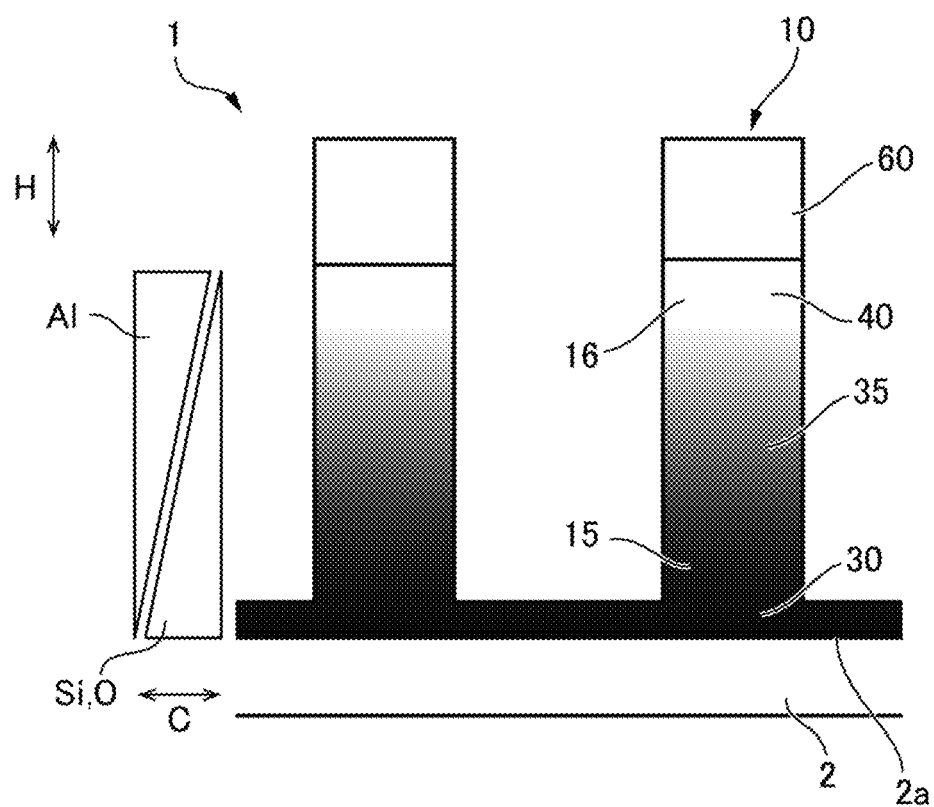
FIG. 2 is a cross-sectional view of a wire grid polarization element according to Exemplary Embodiment 1 of the disclosure.
Figure 3:
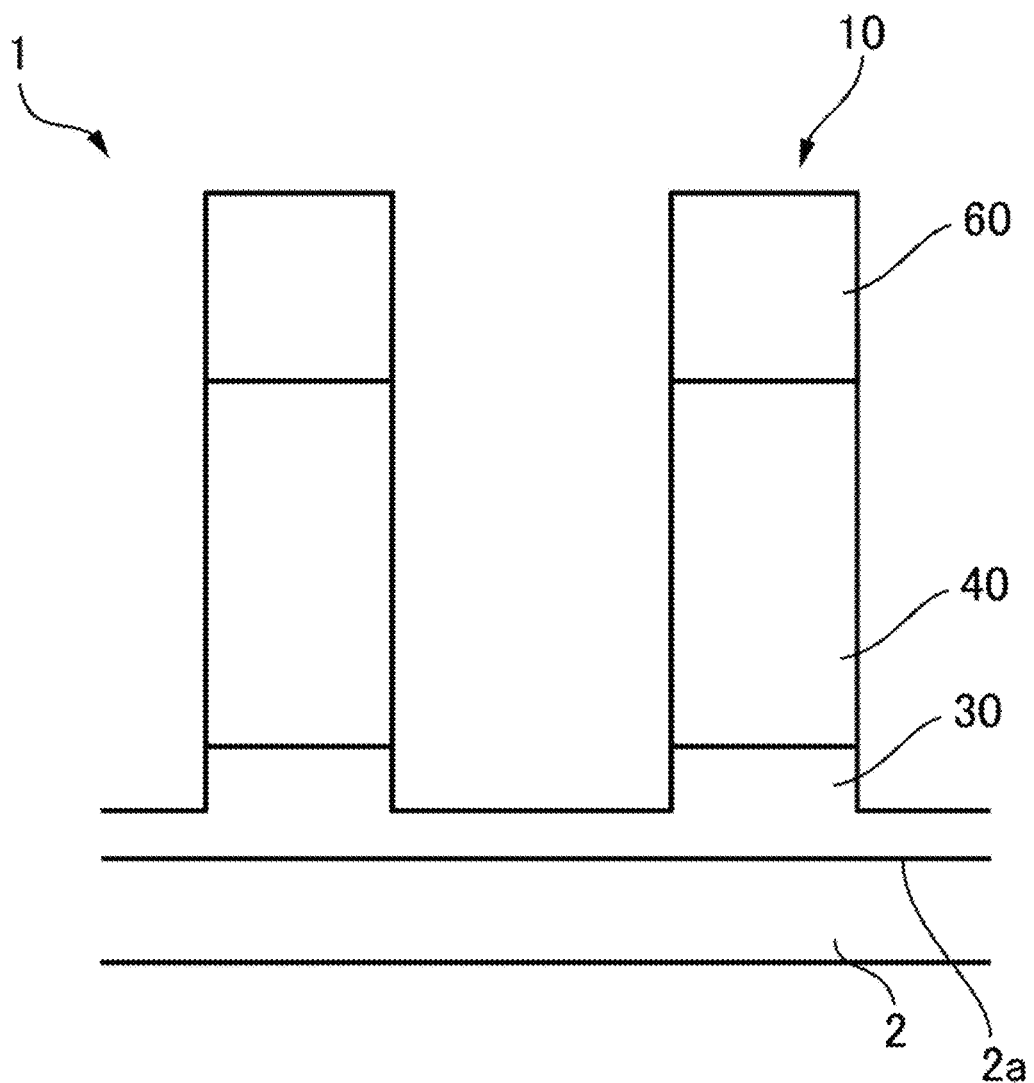
FIG. 3 is an explanatory diagram illustrating a reference example in a case that each region of a wire illustrated in FIG. 2 is a complete layer.

FIG. 2 is a cross-sectional view of the wire grid polarization element 1 according to Exemplary Embodiment 1 of the disclosure. FIG. 3 is an explanatory diagram illustrating a reference example in a case that each region of the wire 10 illustrated in FIG. 2 is a complete layer. Note that in FIG. 2 and FIGS. 7 to 14 referred to in exemplary embodiments described below, a proportion of an element constituting each region in a mixture portion is indicated schematically with a dimension of an arrow C. As illustrated in FIG. 2, in the wire grid polarization element 1 of this exemplary embodiment, the wire 10 includes a reflection section 40 composed primarily of a light reflective material and an absorption section 60 composed primarily of a light absorptive material in a thickness direction H. The absorption section 60 is provided on the side which light is incident with respect to the reflection section 40. In this exemplary embodiment, light is incident from the side provided with the wire 10 with respect to the substrate 2. Thus, the absorption section 60 is provided on the other side of the substrate 2 with respect to the reflection section 40, and the absorption section 60 suppresses light incident from the absorption section 60 side located on the other side of the substrate 2 from reflecting by the wire 10. Note that sides of the wire 10 may be covered by a protective layer such as a silicon oxide or a hafnium oxide.

In this exemplary embodiment, the wire 10 includes a base section 30, which includes the material same as that of the substrate 2, on an opposite side of the reflection section 40 from the absorption section 60.

Thus, as illustrated in FIG. 3, the reference example where all regions of the wire 10 are layers includes a structure where the base section 30, the reflection section 40, and the absorption section 60 are laminated in the thickness direction sequentially on one surface 2a of the substrate 2. In this case, an interface develops between regions.

According to the disclosure, as described below, for the purpose of improvement of reliability, reduction in reflectance or the like, at least the reflection section 40 or the absorption section 60 is provided with a portion including different composition, and a mixture portion where a composition changes gently is provided between portions including different compositions. Between the reflection section 40 and the absorption section 60 may be provided with a mixture portion where a composition changes gently. In this case, although a range of each region may not be expressly prescribed, this exemplary embodiment includes a portion composed primarily of a light reflective material as the reflection section 40, and a portion composed primarily of a light absorptive material as the absorption section 60.

Configuration Example of Each Region

In the wire grid polarization element 1 illustrated in FIG. 2, the reflection section 40 is composed primarily of reflective metal such as aluminum, silver, copper, platinum, or gold. In this exemplary embodiment, from a viewpoint of keeping an absorption loss in the wire grid 19 small in a visible light wavelength region, the reflection section 40 is composed primarily of a light reflective material such as aluminum, aluminum alloy, silver, or silver alloy. In this exemplary embodiment, the reflection section 40 is assumed to be composed primarily of aluminum.

The absorption section 60 is composed primarily of a light absorptive material such as silicon or germanium. In a case that germanium or the like is used for the absorption section 60, a value of a complex refraction index may be optimized by including oxygen and nitrogen. In this exemplary embodiment, the absorption section 60 is assumed to be composed primarily of silicon.

The base section 30 is a region composed primarily of an oxide film, and, in this exemplary embodiment, the base section 30 is a region composed primarily of a silicon oxide similarly to the substrate.

Configuration of Mixture Portion 35

In the wire 10 of the wire grid polarization element 1 illustrated in FIG. 2, the reflection section 40 includes at least one element of oxygen, nitrogen, and carbon. In this exemplary embodiment, the reflection section 40 includes oxygen. Here, between a fifth portion 15 at an edge of a side of the substrate 2 of the reflection section 40 and a sixth portion 16 on an opposite side of of the reflection section 40 (a portion located on an opposite side of the substrate 2 with respect to the fifth portion 15 in the reflection section 40) from the substrate 2 is provided a mixture portion 35 (a third mixture portion) where a proportion of an element (Si and O) included in the base section 30 gradually decreases, and a proportion of aluminum which is an element of a light reflective material gradually increases from the fifth portion 15 to the sixth portion 16. More specifically, in the mixture portion 35 (the third mixture portion), a proportion of aluminum included in the reflection section 40 gradually increases, and a proportion of silicon (Si) and oxygen (O) included in the base section 30 gradually decreases from the fifth portion 15 to the sixth portion 16.

In this exemplary embodiment, the absorption section 60 is a layer where a composition is uniform or approximately uniform in the thickness direction H. Thus, there is an interface between the reflection section 40 and the absorption section 60.

Manufacturing Method of Wire 10

Figure 4:
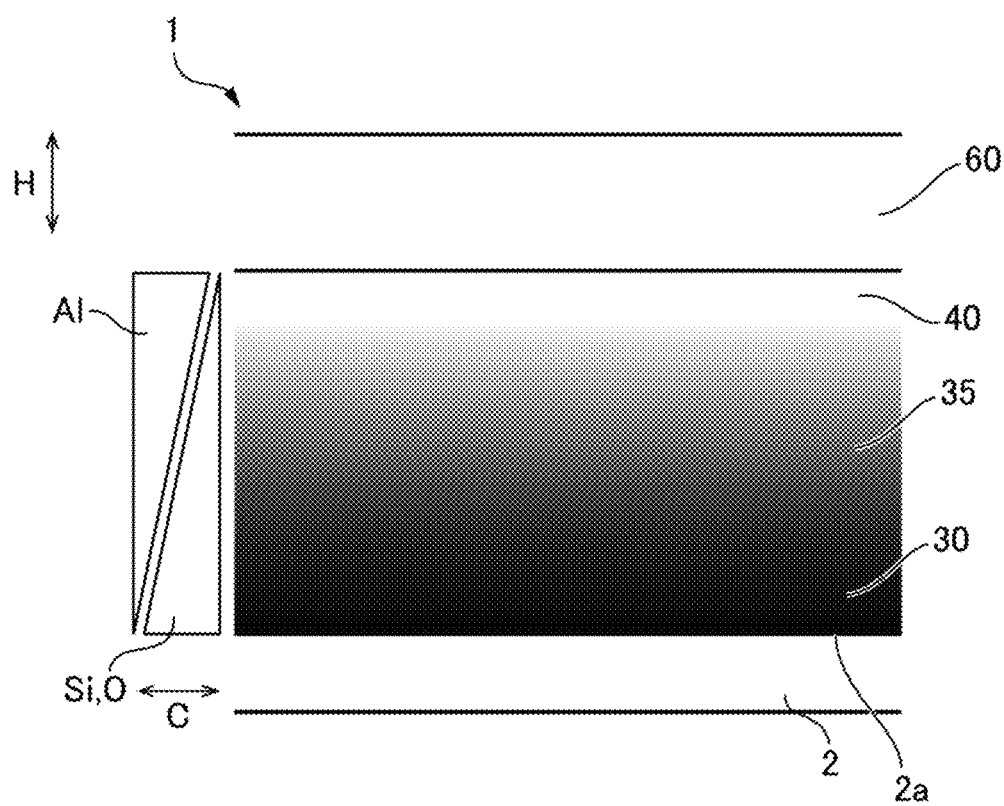
FIG. 4 is an explanatory diagram illustrating a state where films constituting each portion are formed in a manufacturing process of the wire grid polarization element illustrated in FIG. 2.
Figure 5:
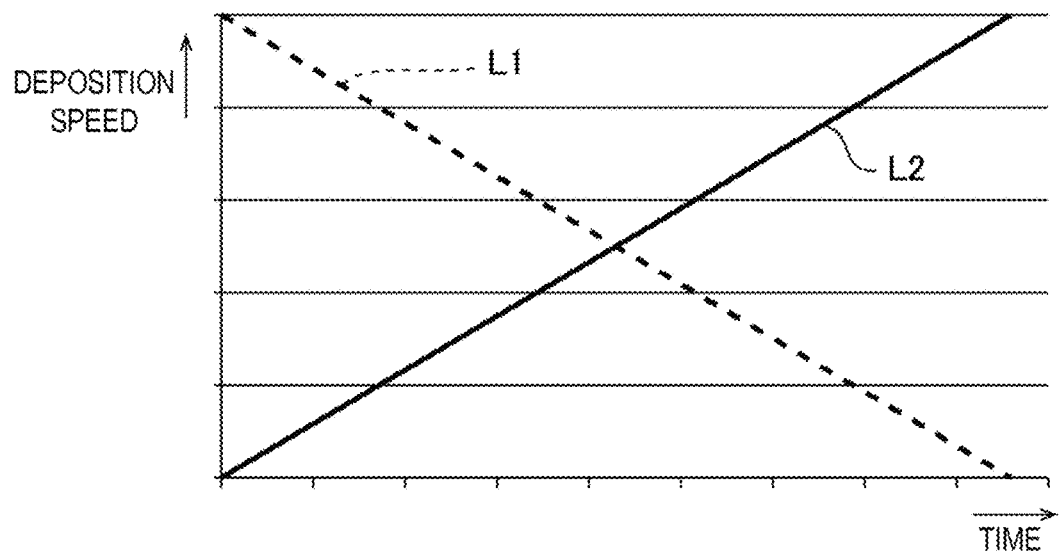
FIG. 5 is an explanatory diagram illustrating an example of a formation method of a mixture portion illustrated in FIG. 4.
Figure 6:
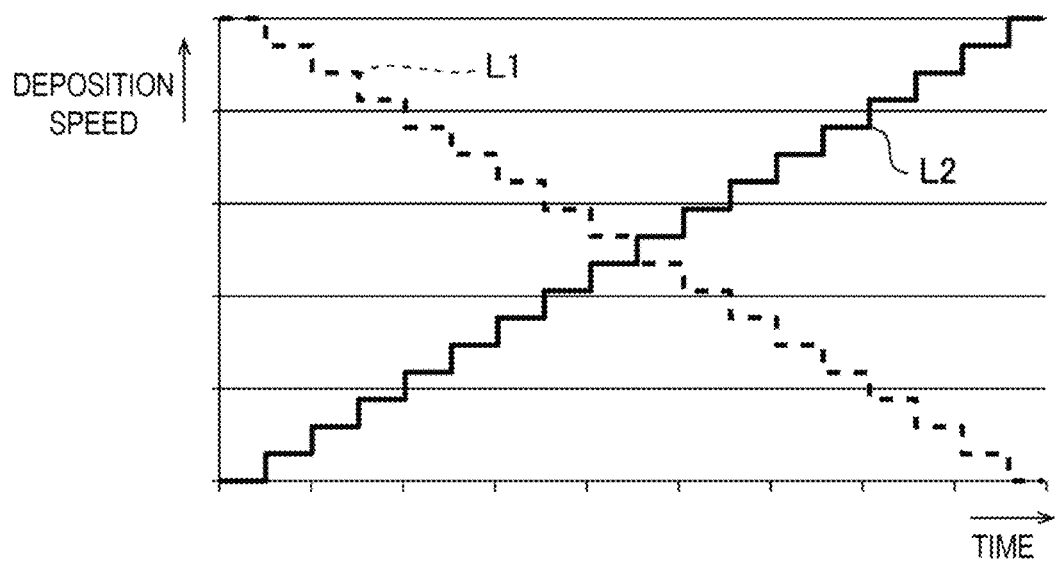
FIG. 6 is an explanatory diagram illustrating another example of a formation method of the mixture portion illustrated in FIG. 4.

FIG. 4 is an explanatory diagram illustrating a state where films constituting each portion are formed in a manufacturing process of the wire grid polarization element 1 illustrated in FIG. 2. FIG. 5 is an explanatory diagram illustrating an example of a formation method of the mixture portion 35 illustrated in FIG. 4. FIG. 6 is an explanatory diagram illustrating another example of a formation method of the mixture portion 35 illustrated in FIG. 4.

In a case of manufacturing the wire grid polarization element 1 illustrated in FIG. 2, after having formed films to form each portion on the one surface 2a of the substrate 2 as illustrated in FIG. 4, all films are patterned to make the wire 10 as illustrated in FIG. 2.

In so doing, for the purpose of providing the mixture portion 35 (the third mixture portion) to reflection section 40, as illustrated schematically in FIG. 5, a deposition speed (as illustrated by a dotted line L1 in FIG. 5) of an element constituting the base section 30 is decreased as a film formation time elapses, and at the same time, a deposition speed (as illustrated by a solid line L2 in FIG. 5) of an element constituting the reflection section 40 is increased the film formation time elapses. For example, in forming the base section 30, the mixture portion 35, and the reflection section 40, using a dual sputter technique, a sputter speed for a target (silicon oxide film) to form the base section 30 is decreased as the film formation time elapses, and at the same time, a sputter speed for a target (aluminum) to form the reflection section 40 is increased as the film formation time elapses. More specifically, in a case of using a high frequency sputter technique, a high frequency sputter electric power for a target (silicon oxide film) to form the base section 30 is reduced, for example, from 800 W to 0 W as the film formation time elapses, and at the same time, a high frequency sputter electric power for a target (aluminum) to form the reflection section 40 is increased, for example, from 0 W to 800 W as the film formation time elapses.

Here, a method to continually change a deposition speed of an element constituting each region can be adopted as illustrated in FIG. 5. In this case, in the mixture portion 35, a proportion of an element constituting the base section 30 and a proportion of an element constituting the reflection section 40 change continually.

A method to change a deposition speed of an element constituting each region in a step-like manner as illustrated as a dotted line L1 and a solid line L2 in FIG. 6 may be adopted. In this case, in the mixture portion 35, a proportion of an element constituting the base section 30 and a proportion of an element constituting the reflection section 40 change in a step-like manner. According to the method, control in a process of film formations is implemented easily. Even in this case, with the number of steps sufficiently increased, in the mixture portion 35, a clear interface does not develop between the base section 30 and the reflection section 40 since a proportion of an element constituting the base section 30 and an element constituting the reflection section 40 change gently.

The film formation methods illustrated in FIGS. 5 and 6 are applicable to a case where any of the mixture portions is provided in the following exemplary embodiments. Although the deposition speeds change in all of the film formation period in FIGS. 5 and 6, an aspect where film formation of the reflection section 40 stops in the early period of the film formation of the base section 30, and a portion contacting with the substrate 2 in the base section 30 includes only a silicon oxide film may be adopted. An aspect where film formation of the base section 30 stops in the late period of the film formation of the reflection section 40, and a portion contacting with the absorption section 60 in the reflection section 40 includes only reflective metal may be adopted. These aspects are appicable to a case where any of the mixture portions is provided in the following exemplary embodiments.

Main Effects of Exemplary Embodiment

As discussed above, in the wire grid polarization element 1 of this exemplary embodiment, there is no interface, where a composition suddenly changes, in a portion between the reflection section 40 and the base section 30, since the base section 30 side of the reflection section 40 is the mixture portion 35 (the third mixture portion) where a composition changes gently from the side of the base section 30. Thus, although the number of interfaces tends to increase in a case that the base section 30 is provided as described with reference to FIG. 3, this exemplary embodiment does not develop an interface between the reflection section 40 and the base section 30. Even if the reflection section 40 is provided with portions having different compositions, an interface does not develop in the reflection section 40. Therefore, problems such as reflection caused by the presence of an interface and reduction of adhesion in an interface under a high temperature environment hardly occur. Preventing reflection caused by an interface in particular brings effects such as being able to enhance transmission efficiency of a first linearly polarized light vibrating in a direction that is perpendicular to an extending direction of the wire 10.

In this exemplary embodiment, since the mixture portion 35 (the third mixture portion) where a proportion of aluminum included in the reflection section 40 gradually increases, and a proportion of silicon and oxygen included in the base section 30 gradually decreases from the fifth portion 15 to the sixth portion 16 of the reflection section 40 is provided in the reflection section 40, the adhesion between the substrate 2 side of the reflection section 40 and the base section 30 is strong. Therefore, even if the temperature of the wire grid polarization element 1 increases, problems such as lowering of the adhesion with the base side of the reflection section 40 hardly occur. Note that there is no interface that develops by varying compositions since the base section 30 and the substrate 2 include the same material.

Exemplary Embodiment 2

Figure 7:
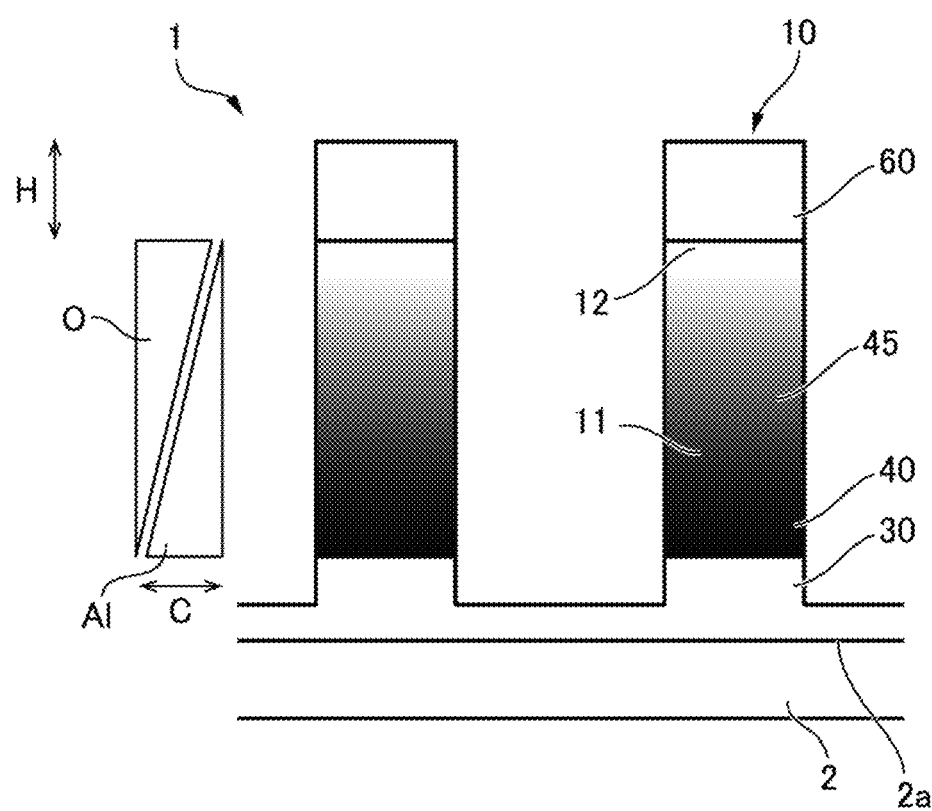
FIG. 7 is a cross-sectional view of a wire grid polarization element according to Exemplary Embodiment 2 of the disclosure.

FIG. 7 is a cross-sectional view of a wire grid polarization element 1 according to Exemplary Embodiment 2 of the disclosure. Although the mixture portion 35 is provided between the fifth portion 15 and the sixth portion 16 of the reflection section 40 in Exemplary Embodiment 1, there can be a configuration where the mixture portion is provided between a second portion 12 at an edge on an opposite side of the reflection section 40 from the substrate 2 and a first portion 11 on the substrate 2 side of the reflection section 40 (a portion located on the side of the substrate 2 with respect to the second portion 12 in the reflection section 40). Specifically, as illustrated in FIG. 7, in the wire 10 of the wire grid polarization element 1, the reflection section 40 includes oxygen, and a mixture portion 45 (the first mixture portion) is provided where a proportion of an element (aluminum) of a light reflective material of the reflection section 40 gradually increases, and a proportion of oxygen gradually decreases from the second portion 12 to the first portion 11 of the reflection section 40. More specifically, in a case that the second portion 12 is composed primarily of aluminum oxide ($Al_2O_3$), in the mixture portion 45 (the first mixture portion), a proportion of aluminum gradually increases, and a proportion of oxygen gradually decreases from the second portion 12 to the first portion 11 of the reflection section 40. Thus, although a proportion of $Al_2O_3$ is large and a proportion of pure aluminum, $Al_2O$, $Al_2O_2$ is small in the second portion 12, a proportion of pure aluminum is larger than a proportion of $Al_2O_3$, $Al_2O$, and $Al_2O_2$ in the first portion 11 on the contrary.

Note that, in this exemplary embodiment, each of the base section 30 and the absorption section 60 is a layer where a composition is uniform or approximately uniform in the thickness direction H. Thus, there is an interface in each of a portion between the base section 30 and the reflection section 40, and a portion between the reflection section 40 and the absorption section 60.

Thus, although the reflection section 40 is provided with portions having different compositions in this exemplary embodiment, an interface does not develop inside the reflection section 40, since a portion between portions having different compositions is the mixture portion 45 (the first mixture portion) where a composition changes gently. Therefore, problems such as reflection caused by the presence of an interface and reduction of adhesion in an interface under a high temperature environment hardly occur. Note that there is no interface that develops by varying compositions since the base section 30 and the substrate 2 include the same material.

Exemplary Embodiment 3

Figure 8:
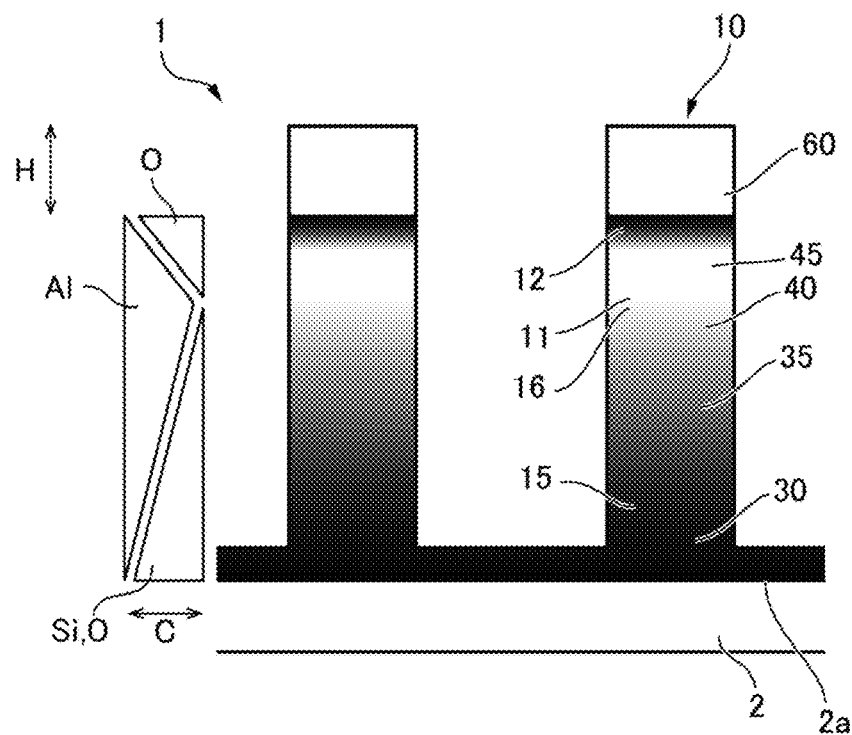
FIG. 8 is a cross-sectional view of a wire grid polarization element according to Exemplary Embodiment 3 of the disclosure.

FIG. 8 is a cross-sectional view of a wire grid polarization element 1 according to Exemplary Embodiment 3 of the disclosure. In this exemplary embodiment, as illustrated in FIG. 8, the mixture portion 35 (the third mixture portion) is provided between the fifth portion 15 and the sixth portion 16 of the reflection section 40, and the mixture portion 45 (the first mixture portion) is provided between the second portion 12 and the first portion 11 of the reflection section 40.

More specifically, the mixture portion 35 (the third mixture portion) is provided between the fifth portion 15 and the sixth portion 16 of the reflection section 40, where a proportion of an element of a light reflective material gradually increases, and a proportion of an element included in the base section 30 gradually decreases from the fifth portion 15 to the sixth portion 16. More specifically, in the mixture portion 35 (the third mixture portion), a proportion of aluminum which is an element of a light reflective material gradually increases, and a proportion of silicon and oxygen which are elements included in the base section 30 gradually decreases from the fifth portion 15 to the sixth portion 16.

The mixture portion 45 (the first mixture portion) is provided between the second portion 12 and the first portion 11 of the reflection section 40, where a proportion of an element of a light reflective material gradually increases, and a proportion of oxygen gradually decreases from the second portion 12 to the first portion 11. More specifically, in a case that the second portion 12 is composed primarily of aluminum oxide ($Al_2O_3$), in the mixture portion 45 (the first mixture portion), a proportion of aluminum gradually increases, and a proportion of oxygen gradually decreases from the second portion 12 to the first portion 11. Thus, although a proportion of $Al_2O_3$ is large and a proportion of pure aluminum, $Al_2O$, $Al_2O_2$ is small in the second portion 12, a proportion of pure aluminum is larger than a proportion of $Al_2O_3$, $Al_2O$, and $Al_2O_2$ in the first portion 11 on the contrary.

Note that, in this exemplary embodiment, the absorption section 60 is a layer where a composition is uniform or approximately uniform in the thickness direction H. Thus, there is an interface between the reflection section 40 and the absorption section 60.

Thus, since this exemplary embodiment does not develop an interface between the base section 30 and the reflection section 40, development of interfaces can be suppressed in the whole wire 10. Although the reflection section 40 is provided with portions having different compositions, an interface does not develop inside the reflection section 40, since a portion between portions having different compositions is the mixture portion 45 (the first mixture portion) where a composition changes gently. Therefore, problems such as reflection caused by the presence of an interface and reduction of adhesion in an interface under a high temperature environment hardly occur. Note that there is no interface that develops by varying compositions since the base section 30 and the substrate 2 include the same material.

Exemplary Embodiment 4

Figure 9:
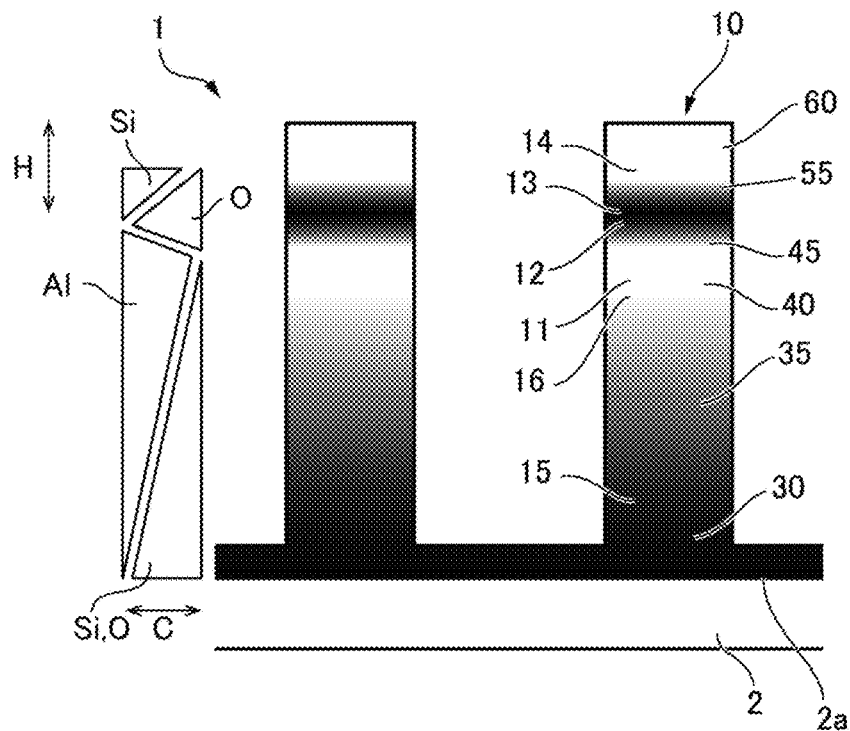
FIG. 9 is a cross-sectional view of a wire grid polarization element according to Exemplary Embodiment 4 of the disclosure.

FIG. 9 is a cross-sectional view of a wire grid polarization element 1 according to Exemplary Embodiment 4 of the disclosure. In this exemplary embodiment, the reflection section 40 and the absorption section 60 each include oxygen, nitrogen, or carbon. In this exemplary embodiment, the reflection section 40 and the absorption section 60 each include oxygen. A mixture portion is provided in the absorption section 60 in addition to the mixture portion 35 (the third mixture portion) and the mixture portion 45 (the first mixture portion) of the reflection section 40.

More specifically, as illustrated in FIG. 9, a mixture portion 55 (a second mixture portion) is provided between a third portion 13 at an edge on a side of the substrate 2 of the absorption section 60 and a fourth portion 14 on an opposite side of the absorption section 60 (a portion on an opposite side of the substrate 2 with respect to the third portion 13 in the absorption section 60) from the substrate 2 where a proportion of an element of a main component included in the absorption section 60 gradually increases, and oxygen gradually decreases from the third portion 13 to the fourth portion 14. More specifically, if the third portion 13 of the absorption section 60 is composed primarily of a silicon oxide, in the mixture portion 55, a proportion of silicon which is an element of a light absorptive material included in the absorption section 60 as a main component gradually increases, and a proportion of oxygen included in the absorption section 60 gradually decreases from the third portion 13 to the fourth portion 14.

Thus, since this exemplary embodiment does not develop an interface between the base section 30 and the reflection section 40, inside the reflection section 40, between the reflection section 40 and the absorption section 60, and inside the absorption section 60, development of interfaces can be suppressed in the whole wire 10. Therefore, problems such as reflection caused by the presence of an interface and reduction of adhesion in an interface under a high temperature environment hardly occur. Note that there is no interface that develops by varying compositions since the base section 30 and the substrate 2 include the same material.

Exemplary Embodiment 5

Figure 10:
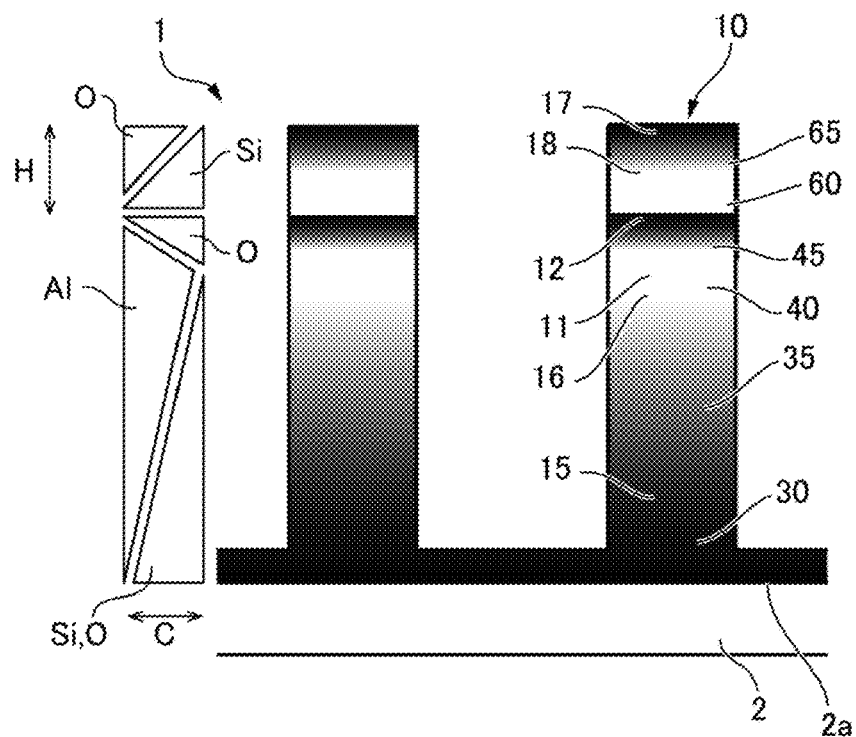
FIG. 10 is a cross-sectional view of a wire grid polarization element according to Exemplary Embodiment 5 of the disclosure.

FIG. 10 is a cross-sectional view of a wire grid polarization element 1 according to Exemplary Embodiment 5 of the disclosure. In this exemplary embodiment, the reflection section 40 and the absorption section 60 each include oxygen, nitrogen, or carbon. In this exemplary embodiment, the reflection section 40 and the absorption section 60 each include oxygen. A mixture portion is provided in the absorption section 60 in addition to the mixture portion 35 (the third mixture portion) and the mixture portion 45 (the first mixture portion) of the reflection section 40.

More specifically, as illustrated in FIG. 10, a mixture portion 65 (a fourth mixture portion) is provided between a seventh portion 17 at an edge on an opposite side of the absorption section 60 from the substrate 2 and an eighth portion 18 on a side of the substrate 2 of the absorption section 60 (a portion located closer to a side of the substrate 20 than the seventh portion 17 of the absorption section 60) where a proportion of an element of a main component included in the absorption section 60 gradually increases, and a proportion of oxygen included in the absorption section 60 gradually decreases from the seventh portion 17 to the eighth portion 18. More specifically, in the mixture portion 65 (the fourth mixture portion), a proportion of silicon which is an element of a light absorptive material included in the absorption section 60 as a main component gradually increases, and a proportion of oxygen included in the absorption section 60 gradually decreases from the seventh portion 17 to the eighth portion 18. Thus, although a proportion of a silicon oxide ($SiO_2$) is large and a proportion of pure silicon (Si) or SiO is small in the seventh portion 17, a proportion of pure silicon is larger than a proportion of silicon oxide ($SiO_2$, and SiO) in the eighth portion 18 on the contrary. Note that, in this exemplary embodiment, there is an interface between the reflection section 40 and the absorption section 60.

Thus, since this exemplary embodiment does not develop an interface between the base section 30 and the reflection section 40, inside the reflection section 40, and inside the absorption section 60, development of interfaces can be suppressed in the whole wire 10. Therefore, problems such as reflection caused by the presence of an interface and reduction of adhesion in an interface under a high temperature environment hardly occur. Note that there is no interface that develops by varying compositions since the base section 30 and the substrate 2 include the same material.

Exemplary Embodiment 6

Figure 11:
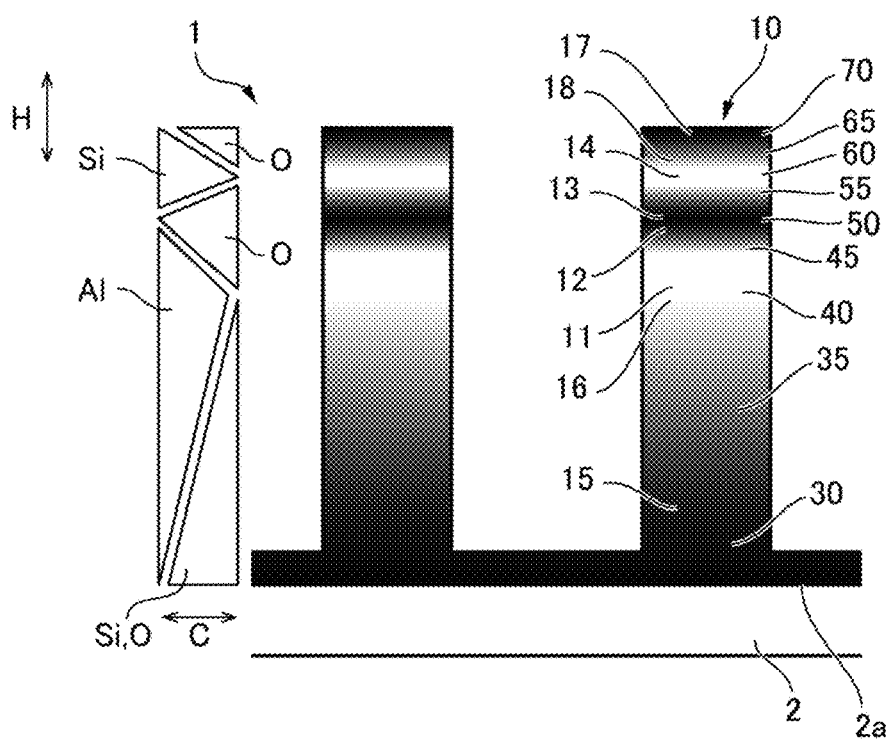
FIG. 11 is a cross-sectional view of a wire grid polarization element according to Exemplary Embodiment 6 of the disclosure.

FIG. 11 is a cross-sectional view of a wire grid polarization element 1 according to Exemplary Embodiment 6 of the disclosure. In this exemplary embodiment, the reflection section 40 and the absorption section 60 each include oxygen, nitrogen, or carbon. In this exemplary embodiment, the reflection section 40 and the absorption section 60 each include oxygen. The mixture portion 35 (the third mixture portion) of the reflection section 40, the mixture portion 45 (the first mixture portion) of the reflection section 40, and the mixture portion 55 (the second mixture portion) of the absorption section 60 are provided.

Thus, in this exemplary embodiment, development of interfaces can be suppressed in the whole wire 10. Therefore, problems such as reflection caused by the presence of an interface and reduction of adhesion in an interface under a high temperature environment hardly occur. Note that there is no interface that develops by varying compositions since the base section 30 and the substrate 2 include the same material.

Exemplary Embodiment 7

Figure 12:
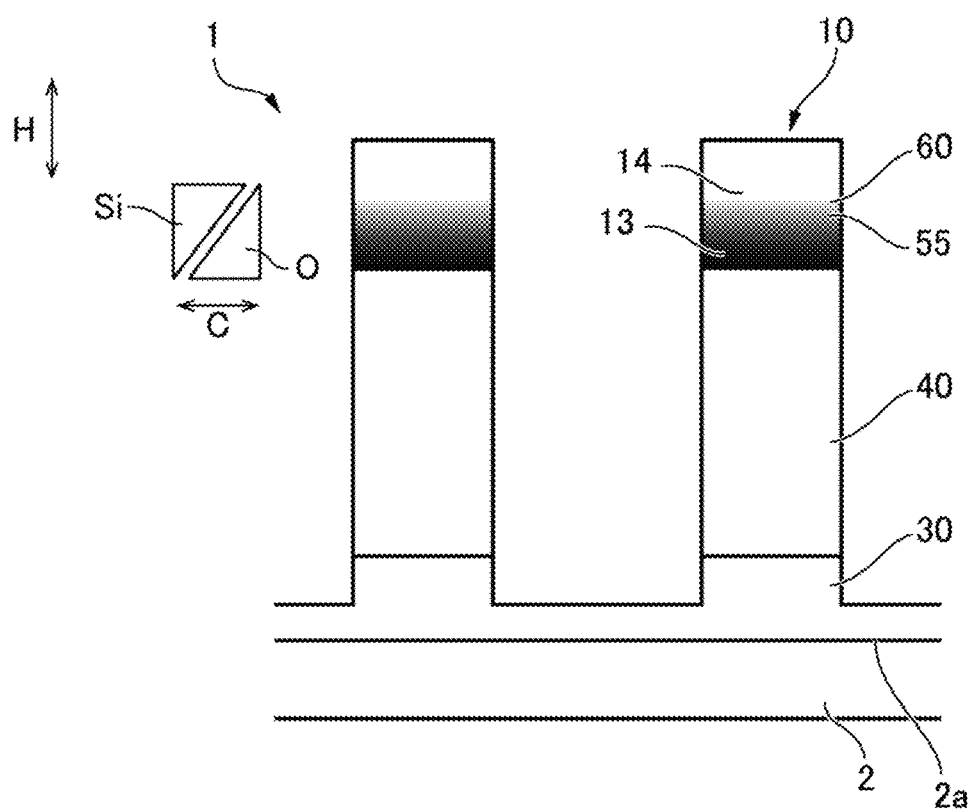
FIG. 12 is a cross-sectional view of a wire grid polarization element according to Exemplary Embodiment 7 of the disclosure.

FIG. 12 is a cross-sectional view of a wire grid polarization element 1 according to Exemplary Embodiment 7 of the disclosure. In this exemplary embodiment, the absorption section 60 includes oxygen, nitrogen, or carbon. In this exemplary embodiment, the absorption section 60 includes oxygen. In this exemplary embodiment, as illustrated in FIG. 12, the mixture portion 55 (the second mixture portion) is provided only between the third portion 13 at an edge on a side of the substrate 2 of the absorption section 60 and the fourth portion 14 on an opposite side of the absorption section 60 from the substrate 2.

Exemplary Embodiment 8

Figure 13:
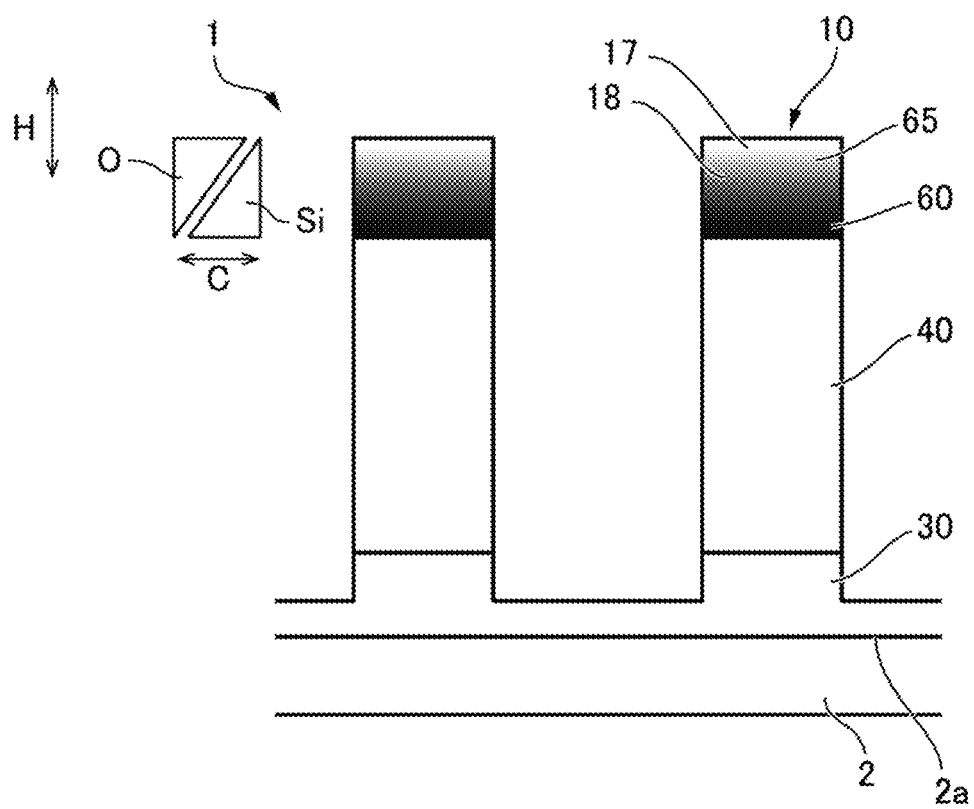
FIG. 13 is a cross-sectional view of a wire grid polarization element according to Exemplary Embodiment 8 of the disclosure.

FIG. 13 is a cross-sectional view of a wire grid polarization element 1 according to Exemplary Embodiment 8 of the disclosure. In this exemplary embodiment, the absorption section 60 includes oxygen, nitrogen, or carbon. In this exemplary embodiment, the absorption section 60 includes oxygen. In this exemplary embodiment, as illustrated in FIG. 13, the mixture portion 65 (the fourth mixture portion) is provided only between the seventh portion 17 at an edge on an opposite side of the absorption section 60 from the substrate 2 and the eighth portion 18 on a side of the substrate 2 of the absorption section 60.

Exemplary Embodiment 9

Figure 14:
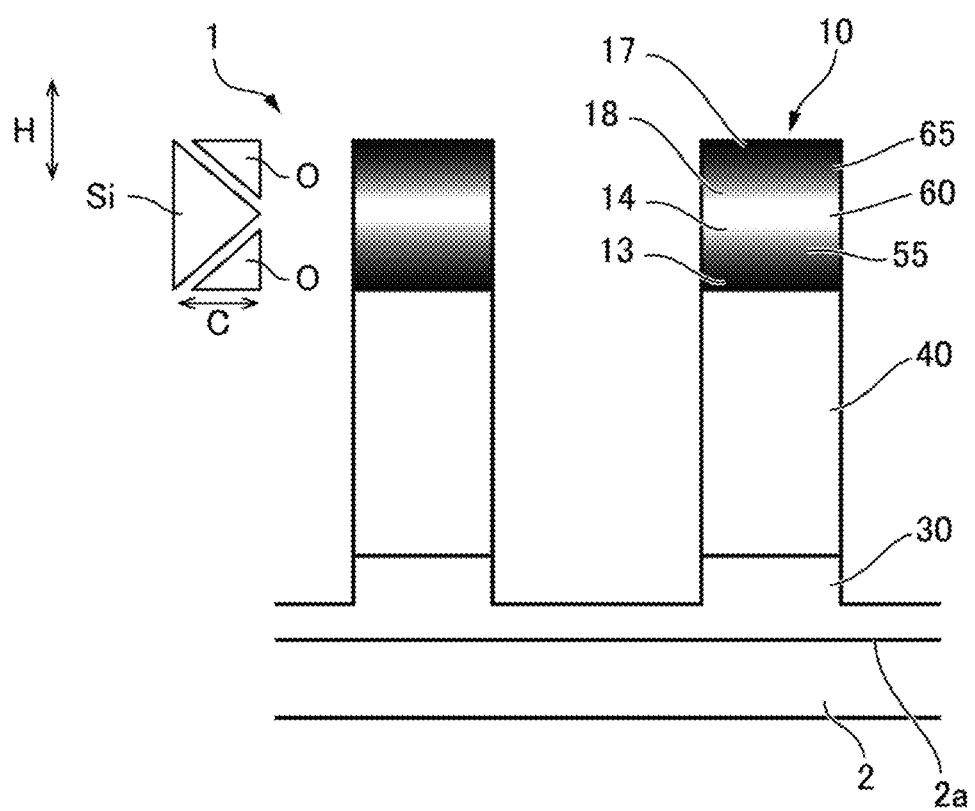
FIG. 14 is a cross-sectional view of a wire grid polarization element according to Exemplary Embodiment 9 of the disclosure.

FIG. 14 is a cross-sectional view of a wire grid polarization element 1 according to Exemplary Embodiment 9 of the disclosure. In this exemplary embodiment, the absorption section 60 includes oxygen, nitrogen, or carbon. In this exemplary embodiment, the absorption section 60 includes oxygen. In this exemplary embodiment, as illustrated in FIG. 14, the mixture portion 55 (the second mixture portion) is provided between the third portion 13 at an edge on a side of the substrate 2 of the absorption section 60 and the fourth portion 14 on an opposite side of the absorption section 60 from the substrate 2. The mixture portion 65 (the fourth mixture portion) is provided between the seventh portion 17 at an edge on an opposite side of the absorption section 60 from the substrate 2 and the eighth portion 18 on a side of the substrate 2 of the absorption section 60.

Another Exemplary Embodiment

Although not shown, an aspect may be provided in which any of the mixture portion 45 (the first mixture portion), the mixture portion 55 (the second mixture portion), the mixture portion 35 (the third mixture portion), and the mixture portion 65 (the fourth mixture portion) may be combined; for example, an aspect may be provided in which the mixture portion 45 (the first mixture portion) illustrated in FIG. 7 and the mixture portion 55 (the second mixture portion) illustrated in FIG. 12 may be provided.

Other Exemplary Embodiments

Although the light absorptive material constituting the absorption section 60 is silicon in the above described exemplary embodiments, the disclosure may be applied with high melting metal such as tungsten, tantalum, titanium, and molybdenum as a light absorptive material. Although the exemplary embodiments mainly described the case where the absorption section 60 and the reflection section 40 include oxygen, the disclosure may be applied to a case that the absorption section 60 and the reflection section 40 include nitrogen or carbon, and in this case, a proportion of nitrogen or carbon changes in a mixture portion. For example, in a case that the absorption section 60 is composed primarily of germanium or the like including nitrogen, a proportion of nitrogen may change in a mixture portion provided in the absorption section 60.

Although the absorption section 60 is provided on an opposite side of the reflection section 40 from the substrate 2 since light is incident from the side provided with the wire 10 to the substrate 2 in the above described exemplary embodiments, the absorption section 60 is provided on the substrate 2 side of the reflection section 40 in a case that light is incident from the opposite side of the wire 10 to the substrate 2. The disclosure may be applied in this case. Although an example using a dual sputter technique is described in the above described exemplary embodiments, a method to change proportions of elements by a reactive sputter technique or the like may be adopted.

Configuration Examples of Projection-Type Display Apparatus

Figure 15:
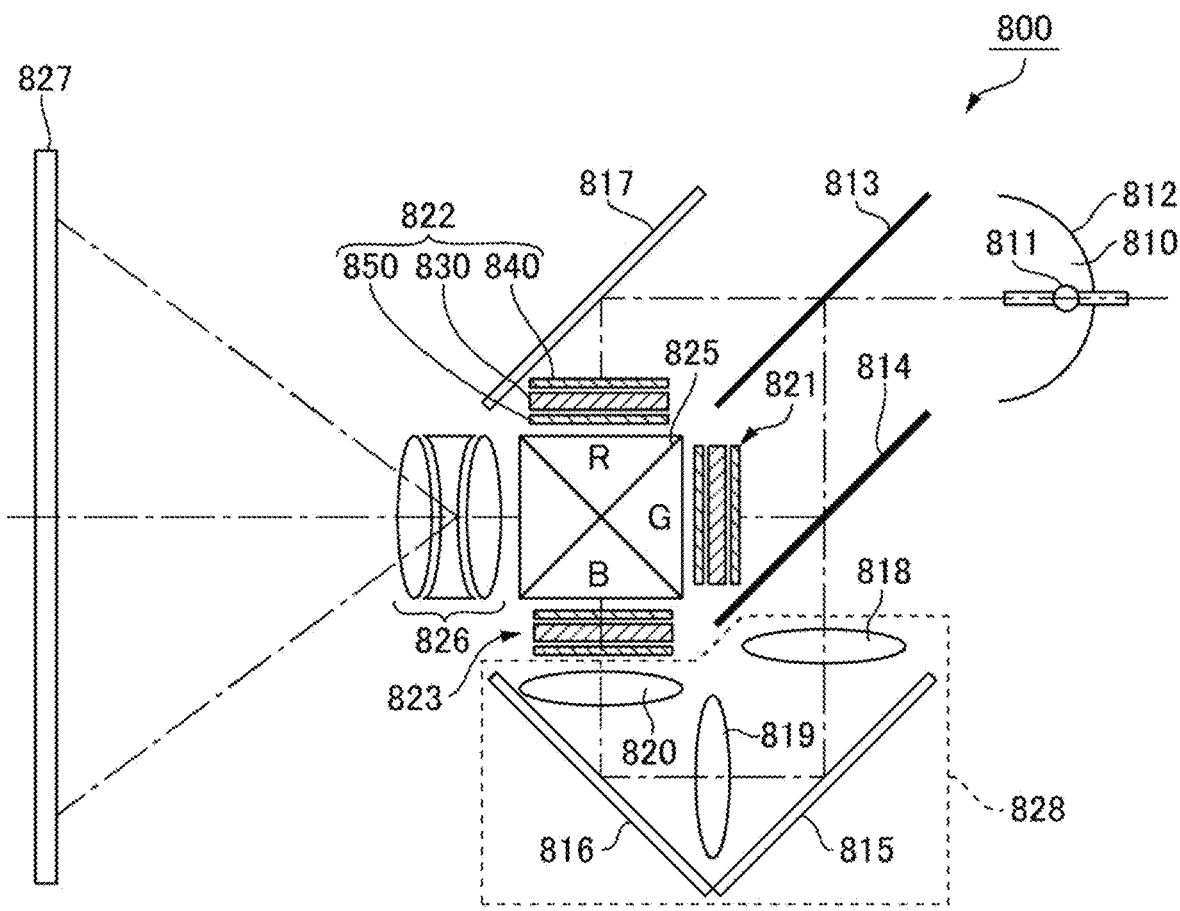
FIG. 15 is an explanatory diagram of a projection-type display apparatus using a transmission type liquid crystal panel (electrooptical device).

A projection-type display apparatus as an example of an electronic device using the wire grid polarization element 1 according to the exemplary embodiments described above will be described. FIG. 15 is an explanatory diagram of a projection-type display apparatus using a transmission type liquid crystal panel (liquid crystal apparatus).

A projection-type display apparatus 800 illustrated in FIG. 15 includes a light source unit 810, dichroic mirrors 813, 814, reflecting mirrors 815, 816, 817, an incident lens 818, a relay lens 819, an emitting lens 820, liquid crystal apparatuses (a first liquid crystal apparatus 821, a second liquid crystal apparatus 822, and a third liquid crystal apparatus 823), a cross dichroic prism 825, and a projecting lens 826 (projection optical system).

The light source unit 810 includes a lamp 811 such as a metal halide lamp, and a reflector 812 configured to reflect light of the lamp. Note that, for the light source unit 810, in addition to the metal halide lamp, a super high-pressure mercury lamp, a flash mercury lamp, a high-pressure mercury lamp, a Deep UV lamp, a xenon lamp, a xenon flash lamp, and the like are also usable. For the light source unit 810, a solid light source such as a laser element and a light emitting diode may be used.

The dichroic mirror 813 transmits red light incorporated in white light from the light source unit 810, and also reflects blue light and green light. The transmitted red light is reflected by the reflecting mirror 817, and is incident on the second liquid crystal apparatus 822 for red light. Of the blue light and the green light reflected by the dichroic mirror 813, the green light is reflected by the dichroic mirror 814, and is incident on the first liquid crystal apparatus 821 for green light. The blue light is transmitted by the dichroic mirror 814 and is incident on the third liquid crystal apparatus 823 for blue light, via a relay optical system 828 including the incident lens 818, the relay lens 819, and the emitting lens 820, and provided to prevent an optical loss due to a long optical path.

In each of the first liquid crystal apparatus 821, the second liquid crystal apparatus 822, and the third liquid crystal apparatus 823, an incident side polarization element 840 and an emitting side polarization element 850 are disposed on both sides sandwiching a liquid crystal panel 830. The incident side polarization element 840 is provided in an incident path between the light source unit 810 and the liquid crystal panel 830 on an optical path of light emitted from the light source unit 810. The emitting side polarization element 850 is provided in an emitting path between the liquid crystal panel 830 and the projecting lens 826 on an optical path of light passing through the liquid crystal panel 830. The incident side polarization element 840 and the emitting side polarization element 850 are disposed to have transmission axes perpendicular to each other.

The incident side polarization element 840 is a reflective polarization element, and reflects light having a vibration direction perpendicular to the transmission axis. The emitting side polarization element 850 is an absorptive polarization element using the wire grid polarization element 1 to which the disclosure is applied.

Light of three colors modulated by the first liquid crystal apparatus 821, the second liquid crystal apparatus 822, and the third liquid crystal apparatus 823 is incident on the cross dichroic prism 825. This cross dichroic prism 825 is obtained by bonding four right angle prisms, and a dielectric multilayer film configured to reflect red light and a dielectric multilayer film configured to reflect blue light are formed as an X shape on interfaces of the prisms. These dielectric multilayer films synthesize the light of the three colors to form light expressing a color image. The synthesized light is projected on a screen 827 by the projecting lens 826 being the projection optical system, and the image is expanded and displayed.

In this exemplary embodiment, since the wire grid polarization element 1 to which the disclosure is applied is used for the emitting side polarization element 850 in each of the first liquid crystal apparatus 821, the second liquid crystal apparatus 822, and the third liquid crystal apparatus 823, a situation in which light reflected by the emitting side polarization element 850 is incident on the liquid crystal panel 830 is unlikely to occur.

Note that although the wire grid polarization element 1 to which the disclosure is applied is used for the emitting side polarization element 850 in this exemplary embodiment, an aspect may use the wire grid polarization element 1 to which the disclosure is applied for the incident side polarization element 840, or an aspect may use the wire grid polarization element 1 to which the disclosure is applied for both of the incident side polarization element 840 and the emitting side polarization element 850.

Other Projection-Type Display Apparatuses

Note that the projection-type display apparatus may include a configuration in which an LED light source or the like configured to emit light of each color is used as a light source unit and the light of each color emitted from the LED light source is supplied to another liquid-crystal device. The wire grid polarization element 1 to which the disclosure is applied may be used, not only in the above described projection-type display apparatus 800, but also in the case of constituting a liquid crystal apparatus in an electronic device such as a head-mounted display, a personal computer, a liquid crystal television, and a car navigation device.

What is claimed is:

1. A wire grid polarization element comprising:
   a substrate; and
   a wire including a reflection section including a light reflective material, and an absorption section including a light absorptive material and provided on an opposite side of the reflection section from the substrate, wherein
   the reflection section includes at least one element of oxygen, nitrogen, and carbon and an element included in the substrate, and
   a first mixture portion is provided between a first portion at an edge on the substrate side of the reflection section and a second portion on an opposite side of the reflection section from the substrate, and in the first mixture portion a proportion of the at least one element of oxygen, nitrogen, and carbon and a proportion of an element included in the substrate gradually decrease and a proportion of an element of the light reflective material gradually increases from the first portion to the second portion.

2. A liquid crystal apparatus comprising the wire grid polarization element according to claim 1, wherein
   the wire grid polarization element is disposed on at least one of an incident path of light to a liquid crystal panel and an emitting path of light from the liquid crystal panel.

3. An electronic device comprising the liquid crystal apparatus according to claim 2.

4. The wire grid polarization element according to claim 1, wherein
   the absorption section includes at least one element of oxygen, nitrogen, and carbon, and
   a second mixture portion is provided between a third portion at an edge on the substrate side of the absorption section and a fourth portion on an opposite side of the absorption section from the substrate, and in the second mixture portion a proportion of the at least one element of oxygen, nitrogen, and carbon gradually decreases and a proportion of an element of the light absorptive material gradually increases from the third portion to the fourth portion.

5. The wire grid polarization element according to claim 1, wherein
   a third mixture portion is provided between a fifth portion on the substrate side of the reflection section and a sixth portion at an edge on an opposite side of the reflection section from the substrate, and in the third mixture portion a proportion of the at least one element of oxygen, nitrogen, and carbon gradually decreases and a proportion of an element of the light reflective material gradually increases from the sixth portion to the fifth portion.

6. The wire grid polarization element according to claim 1, wherein
   the absorption section includes at least one element of oxygen, nitrogen, and carbon, and
   a fourth mixture portion is provided between a seventh portion at an edge on an opposite side of the absorption section from the substrate and an eighth portion on the substrate side of the absorption section, and in the fourth mixture portion a proportion of the at least one element of oxygen, nitrogen, and carbon gradually decreases and a proportion of an element of the light absorptive material gradually increases from the seventh portion to the eighth portion.

* * * * *